July 14, 1970
G. ORLOFF
3,520,230
HYDRAULICALLY OPERATED SERVOMECHANISMS Filed Sept. 13, 1968

Inventor
George Orloff
BY Watson, Cole, Grindle & Watson
Attorneys

United States Patent Office 3,520,230
Patented July 14, 1970

3,520,230
HYDRAULICALLY OPERATED
SERVOMECHANISMS
George Orloff, Newbury, England, assignor to Molins
Machine Company Limited, Deptford, London, England, a corporation of Great Britain
Filed Sept. 13, 1968, Ser. No. 759,609
Claims priority, application Great Britain, Sept. 15, 1967,
42,274/67
Int. Cl. F15b 18/00; F01b 21/00
U.S. Cl. 91—413  2 Claims

ABSTRACT OF THE DISCLOSURE

A servomechanism having two hydraulic actuators of different effective areas so that fluid at the same pressure applied to the actuator of smaller effective area will produce a higher velocity of movement then when applied to the other actuator, but with lower hydraulic stiffness. The smaller actuator is used when the servo error is large, and the larger actuator is used when the error is small, the other actuator in each case being by-passed.

---

This invention concerns improvements in or relating to hydraulically operated servomechanisms, in particular for use in machine tools.

In a machine tool it is frequently required to move a carriage with a high approach velocity to bring a workpiece mounted on the carriage into the range of action of a cutting tool (or to bring a cutting tool mounted on the carriage up to a workpiece), and then to move the carriage more slowly during the actual cutting or metal removal operation on the workpiece. With a hydraulically operated mechanism for moving the carriage, in particular in a machine tool of high accuracy, a high degree of hydraulic stiffness and rigidity is required during the actual machining operation, i.e. while the tool is acting on the workpiece, to provide the necessary reaction to the cutting load and to maintain accuracy. A hydraulic actuator used for this purpose therefore needs a comparatively large effective thrust area, and it has been found that, due to possible entrainment of air in the hydraulic fluid, high pressure of around 1,000 p.s.i. are sometimes necessary to achieve the desired high fluid bulk modulus. However, during the approach period while the carriage is moved to bring the workpiece and cutter tool into close relationship, but before the tool actually starts cutting the workpiece, no such high degree of hydraulic stiffness and rigidity is necessary. Thus the use of a system providing the high stiffness and rigidity required for the actual cutting operation, for the approach movement can result in wasteful utilization of power.

According to the present invention there is provided a servomechanism for effecting movement of a member, comprising a first hydraulic actuator having a relatively small effective thrust area to produce relatively high velocity motion of the member with relatively low hydraulic stiffness, a second hydraulic actuator having a relatively large effective thrust area to produce relatively low velocity motion of the member wth relatively high hydraulic stiffness, input valve means selectively operable to supply hydraulic fluid under pressure to one or the other of said actuators to produce a pressure differential therein, by-pass valve means selectively operable to provide for one or the other of said actuators a hydraulic by-pass circuit connecting with the actuator and by-passing said input valve means, and switch means to control said input and by-pass valve means and operable in response to the magnitude of the error between the desired and actual positions of said member so that when the error is greater than a predetermined value said input valve means is effective to operate said first actuator and said by-pass valve means is effective to provide a by-pass circuit for said second actuators and when the error is less than the predetermined value said input valve means is effective to operate said second actuator and said by-pass valve means is effective to provide a by-pass circuit for said first actuator. Preferably, said input valve means comprises a first input valve operable to control flow of hydraulic fluid under pressure to said first actuator, and a second input valve operable to control flow of hydraulic fluid under pressure to said second actuator, and said by-pass valve means comprises a first by-pass valve operable to provide a by-pass circuit for said first actuator, and a second by-pass valve operable to provide a by-pass circuit for said second actuator, said switch means being operable to control said valves so that when said error is greater than the predetermined value said first input valve is operable to produce a presure differential in said first actuator and said second by-pass valve is operative and said second input valve and said first by-pass valve are inoperative, and when said error is less than the predetermined value said second input valve is operative to produce a pressure differential in said second actuator and said first by-pass valve is operative and said first input valve and said second by-pass valve are inoperative.

Mechanism in accordance with the invention will now be described, by way of example, with reference to the accompanying drawing in which.

Figure 1:
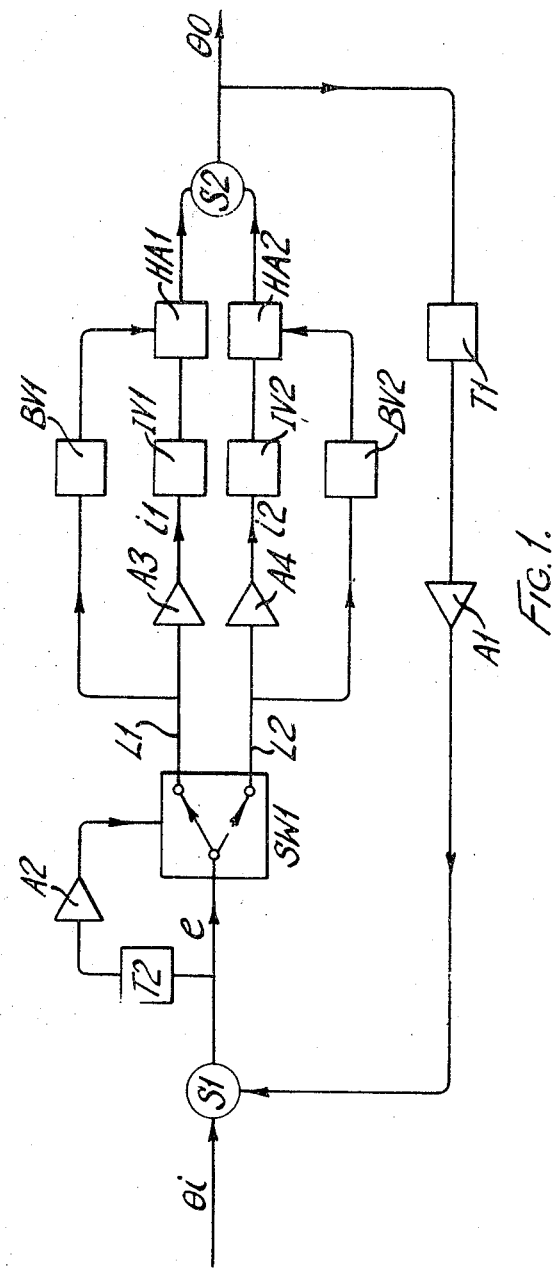
FIG. 1 is a block diagram of a servo-system.

Referring firstly to FIG. 1, a summing device S1 receives an input demand $\theta i$ and a feed-back signal representative of the output $\theta o$, the feedback path being through a transducer T1 and an amplifier A1. The summing device S1 thus emits a signal $e$ representative of the error between the input demand and the output, which, since the system is used as explained later to effect movement of a member, represents the error between the desired and actual positions of the member. The magnitude of the error is detected by a transducer T2 which operates a switch SW1 through an amplifier A2. If the transducer T2 detects that the error is large, i.e. is greater than a predetermined value, the switch SW1 passes the error signal $e$ to a line L1, but if the error is small, i.e. less than said predetermined value, the switch passes the signal to a line L2. Thus when the error changes from large to small the transducer T2 operates the switch SW1 to transfer the signal from the line L1 on to the line L2.

The line L1 passes through an amplifier A3 whose output current $i1$ controls a hydraulic input valve IV1 through which hydraulic fluid under pressure can be fed to operate a hydraulic actuator HA1. The line L1 also connects with a solenoid operated hydraulic by-pass valve BV1 connecting with the actuator HA1 and whose purpose, as more fully explained later, is to provide a hydraulic circuit by-passing the input valve IV1. The line L2 similarly passes through an amplifier A4 whose output current $i2$ controls a hydraulic input valve IV2 through which hydraulic fluid under pressure can be fed to operate a hydraulic actuator HA2. The line L2 also connects with a solenoid operated hydraulic by-pass valve BV2 which connects with the actuator HA2 and can provide a hydraulic circuit by-passing the input valve IV2.

Signals from the actuators HA1 and HA2 are effectively summed by a summing device S2 to provide the output signal $\theta o$.

The hydraulic actuator HA1 has a small effective thrust area while that of the actuator HA2 is relatively large. The octuator HA1 is thus adapted to produce relatively high velocity motion with low hydraulic stiffness whereas the actuator HA2 is adapted to produce low velocity motion with high hydraulic stiffness. When the error signal $e$ is large, and is therefore passed by the switch SW1 to the line L1, the signal is effective to hold the input valve IV1 open so that hydraulic fluid under pressure is fed therethrough and operates the actuator HA1, and to hold the by-pass valve BV1 closed, the input valve IV2 to the actuator HA2 being closed and the by-pass valve BV2 being open so that hydraulic fluid from the actuator HA2 can flow around the by-pass circuit provided by the valve BV2 thereby eliminating any significant impedance by that actuator. When the error changes in magnitude from large to small, i.e. becomes less than said prdetermined value, the switch SW1 transfers the error signal to the line L2 thereby opening the input valve IV2 to operate the actuator HA2 and closing the by-pass valve BV2, the input valve IV1 becoming closed and the by-pass valve BV1 becoming open to eliminate significant impedance by the actuator HA1.

Figure 2:
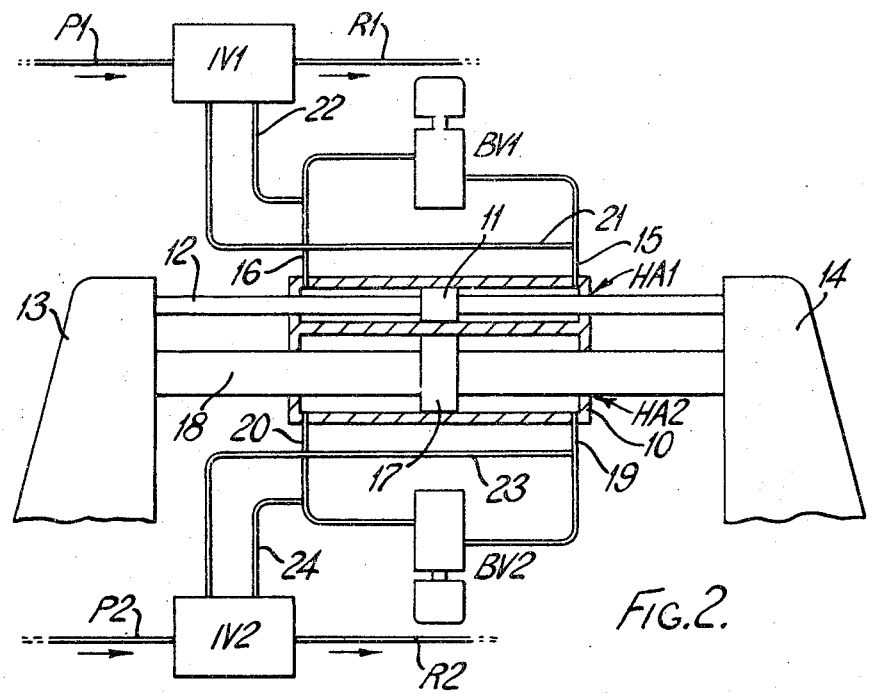
FIG. 2 is a side elevation, partly in section, of hydraulic actuator mechanism in a machine tool.

FIG. 2 shows the actuators HA1 and HA2 supporting a carriage 10 of a machine tool. The actuator HA1 comprises a piston head 11 on a rod 12 whose ends are mounted in fixed supports 13 and 14 forming parts of the machine tool frame. A fluid connection 15 and a fluid connection 16 communicate with a cylinder in the carriage 10 so that different fluid pressures on opposite sides of the piston head 11 effect linear movement of the carriage. The actuator HA2 similarly comprises a piston head 17 on a rod 18 whose ends are mounted in the supports 13 and 14 and a fluid connection 19 and a fluid connection 20 communicate with a cylinder in the carriage 10 so that different fluid pressures on opposite sides of the piston head 17 effect linear movement of the carriage.

As can be seen from FIG. 2 the effective thrust area provided by the piston head 17 is greater than that provided by the piston head 11 so that low velocity high stiffness movement can be effected by use of the actuator HA2 and high velocity low stiffness movement can be effected by use of the actuator HA1.

The fluid connections 15 and 16, communicate, via pipes 21 and 22 respectively, with the inlet valve IV1 to which fluid under pressure is fed through an inlet pipe P1 and from which a return pipe R1 leads to tank. The inlet valve IV1 is selectively operable to apply a pressure differential across the piston head 11 in either sense, depending on the direction in which it is desired to move the carriage 10. The connection pipes 15 and 16 also communicate with the by-pass valve BV1 which is arranged in the hydraulic circuitry in parallel with the inlet valve IV1. Thus, when the inlet valve IV1 is closed so that the incoming pressure fluid is not fed into the cylinder of the actuator HA1 and the by-pass valve BV1 is open, fluid can flow round the circuit provided by the pipes 15 and 16 and the valve BV1, by-passing the inlet valve IV1, when the carriage 10 is moved by operation of the actuator HA2. When the by-pass valve BV1 is closed and the inlet valve IV1 is open so that fluid pressure is fed into the cylinder, the hydraulic actuator HA1 operates to move the carriage 10.

In a similar manner the fluid connections 19 and 20 communicate, via pipes 23 and 24 with the inlet valve IV2 to which fluid under pressure is fed through an inlet pipe P2 and from which a return pipe R2 leads to tank (the fluid pressures in the pipes P1 and P2 being the same). The valve IV2 is similar to the valve IV1 so that a pressure differential may be applied across the piston head 17 in either sense, depending on the direction in which it is desired to move the carriage 10. The connection pipes 19 and 20 also communicate with the by-pass valve BV2 which is arranged in parallel across these pipes in parallel with the inlet valve IV2. Thus, when the inlet valve IV2 is closed so that the incoming pressure fluid is not fed into the cylinder of the actuator HA2 and the by-pass valve BV2 is open, fluid can flow round the circuit provided by the pipes 19 and 20 and the valve BV2, by-passing the inlet valve IV2, when the carriage 10 is moved by operation of the hydraulic actuator HA1. When the by-pass valve BV2 is closed and the inlet valve IV2 is open so that fluid pressure is fed into the cylinder, the hydraulic actuator HA2 operates to move the carriage 10.

Figure 3:
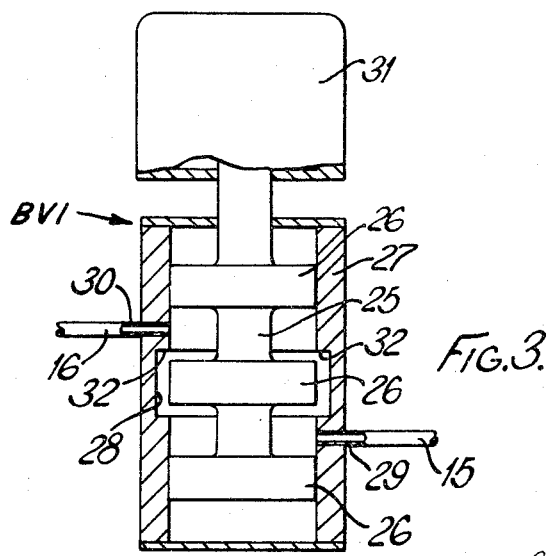
FIG. 3 is a section through part of the mechanism shown in FIG. 2.

The construction of the by-pass valve BV2 is the same as that of the by-pass valve BV1, which is shown in FIG. 3. The valve is a spool valve having a stem 25 carrying three disc flanges 26 and contained in a housing 27 providing an annular space 28 round, and of greater depth and width, than the central flange 26. The housing 27 provides fluid connections 29 and 30, one above and the other below the space 28 as viewed in FIG. 3, to which the pipes 15 and 16 are respectively connected. The stem 25 projects from the housing 27 and enters a solenoid housing 31 containing a solenoid which, when energised, effects axial movement of the stem. When the valve is open, as shown in FIG. 3, fluid can flow through the space 28 and past the central flange 26, which is positioned clear of shoulders 32 defining the limits of the space 28, and hence through the valve. When the solenoid is energised to close the valve, the axial (e.g. upward, as viewed in FIG. 3) movement of the stem 25 causes the central flange 26 to substantially abut the shoulder 32, thereby preventing the passage of fluid through the valve.

As explained previously, when the error between the desired and actual positions of the carriage 10 is greater than a predetermined value, the actuator HA1 is operated (with low hydraulic stiffness) to effect high velocity motion of the carriage 10, the actuator HA2 not being positively operated but not significantly impeding the motion by reason of its passing fluid round the by-pass circuit provided by the by-pass valve BV2. When the error falls below said predetermined value the hydraulic actuator HA2 is operated (with high hydraulic stiffness) to effect low velocity motion of the carriage, the actuator HA1 not being positively operated but not significantly impeding the motion by reason of its passing fluid round the by-pass circuit provided by the by-pass valve BV1.

It will be appreciated that by this arrangement, and by suitable selections of said predetermined value to accord with the particular circumstances, the carriage 10 can be moved with a high approach velocity to bring a workpiece mounted thereon into the range of action of a cutting tool (or to bring a cutting tool mounted on the carriage up to a workpiece), when high hydraulic stiffness conditions are not required, and can then be moved at low velocity with high hydraulic stiffness and reaction to cutting load while the actual cutting operation on the workpiece takes place.

What I claim as my invention and desire to secure by Letters Patent is:

1. A servomechanism for effecting movement of a member, comprising a first hydraulic actuator having a relatively small effective thrust area to produce relatively high velocity motion of the member with relatively low hydraulic stiffness, a second hydraulic actuator having a relatively large effective thrust area to produce relatively low velocity motion of the member with relatively high hydraulic stiffness, input valve means selectively operable to supply hydraulic fluid under pressure to one or the other of said actuators to produce a pressure differential therein, by-pass valve means selectively operable to provide for one or the other of said actuators a hydraulic by-pass circuit connecting with the actuator and by-passing said input valve means, and switch means to control said input and by-pass valve means and operable in response to the magnitude of the error between the desired and actual positions of said member so that when the error is greater than a predetermined value said input valve means is effective to operate said first actuator and said by-pass valve means is effective to provide a by-pass circuit for said second actuator and when the error is less than the predetermined value said input valve means is effective to operate said second actuator and said by-pass valve means is effective to provide a by-pass circuit for said first actuator.

2. A servomechanism as claimed in claim 1, wherein said input valve means comprises a first input valve operable to control flow of hydraulic fluid under pressure to said first actuator, and a second input valve operable to control flow of hydraulic fluid under pressure to said second actuator, and said by-pass valve means comprises a first by-pass valve operable to provide a by-pass circuit for said first actuator, and a second by-pass valve operable to provide a by-pass circuit for said second actuator, said switch means being operable to control said valves so that when said error is greater than the predetermined value said first input valve is operable to produce a pressure differential in said first actuator, said second by-pass valve is operative, and said second input valve and said first by-pass valve are inoperative, and when said error is less than the predetermined value said second input valve is operative to produce a pressure differential in said second actuator, said first by-pass valve is operative, and said first input valve and said second by-pass valve are inoperative.

References Cited

UNITED STATES PATENTS

| | | | |
|---|---|---|---|
| 446,799 | 2/1891 | Thorpe | 60—97 |
| 1,020,176 | 3/1912 | Astfalck | 91—413 XR |
| 2,157,240 | 5/1939 | Keel | 91—413 XR |
| 2,511,883 | 6/1950 | Thierry | 91—412 XR |
| 2,916,205 | 12/1959 | Litz | 60—97 XR |

FOREIGN PATENTS 241,234     1927    Great Britain.

EDGAR W. GEOGHEGAN, Primary Examiner

U.S. Cl. X.R.

60—97